Patented Oct. 8, 1946

2,408,897

UNITED STATES PATENT OFFICE 2,408,897

DERIVATIVES OF ISOASCORBIC ACID

Percy A. Wells, Abington, and Daniel Swern, Melrose Park, Pa., assignors to the United States of America, as represented by the Secretary of Agriculture No Drawing. Application May 11, 1942,
Serial No. 442,557

7 Claims. (Cl. 260—344.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to derivatives of isoascorbic acid and is directed more particularly to the isoascorbic acid esters of carboxylic acids and to methods for producing the same.

The empirical formula of isoascorbic acid is $C_8H_8O_6$ and the spatial configurations of the two enantiomorphic forms of isoascorbic acid are believed to be represented by the following structural formulas:

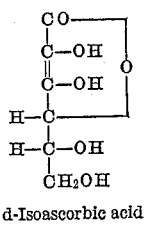

d-Isoascorbic acid

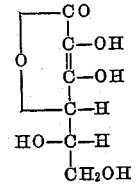

l-Isoascorbic acid

It is well known that with the exception of the optical rotation enantiomorphs possess identical physical and chemical properties. In the present specification and claims the term isoascorbic acid is meant therefore to include both the d- and the l-form of isoascorbic acid.

We have discovered that isoascorbic esters are formed by the interaction of isoascorbic acid with aliphatic monocarboxylic acids or with acyl halides derived from such acids.

These isoascorbyl esters are new compounds having valuable properties which render them useful as components or as intermediates in the manufacture of various synthetic materials. For example, some of the higher fatty esters of isoascorbic acid, such as for instance isoascorbyl laurate, myristate, palmitate, stearate and the like are fat soluble compounds having anti- oxidant properties, as claimed by Percy A. Wells and Roy W. Riemenschneider in their application, Serial No. 472,280, filed January 13, 1943.

In the production of isoascorbyl esters by the interaction of isoascorbic acid with acyl halides the esterification can be performed by known acylating methods in the presence, or in the absence, of suitable solvent or dispersing media such as pyridine and the like.

The monoesters of isoascorbic acid are obtained most readily by reacting isoascorbic acid with aliphatic monocarboxylic acids in the presence of concentrated sulfuric acid, as described in our copending application Serial No. 442,558, Patent 2,350,435.

According to this procedure the fatty acid and isoascorbic acid are dissolved in concentrated sulfuric acid and the reaction mixture is maintained at a suitable temperature for the length of time necessary to effect esterification. The reaction products are then isolated from the solution by any suitable procedure, for example by dilution with water followed by solvent extraction.

In effecting the esterification by the above procedure we prefer to use 90–95 percent sulfuric acid. However, sulfuric acid of other concentrations may be employed provided that it is adapted for performing the dual function of an esterification catalyst and of a solvent for the components of the reaction mixture.

The esterification may be carried out at any temperature which will not cause any substantial sulfonation, or decomposition of the components of the reaction mixture. When 95 percent sulfuric acid is used satisfactory results are obtained by operating at ordinary room temperature.

However, the reaction velocity of esterification processes is increased at higher temperatures and under certain conditions it may be advantageous to conduct the process at temperatures above room temperature.

An important feature of our invention is the fact that when esterification is effected in the presence of sulfuric acid by interaction of isoascorbic acid with aliphatic monocarboxylic acids the esters formed retain the characteristic properties of compounds containing an unsubstituted ene-diol group, that is the atomic grouping, $$\begin{array}{c} -C-OH \\ \parallel \\ -C-OH \end{array}$$

present in isoascorbic acid.

The presence of an unsubstituted ene-diol group in the isoascorbyl esters obtained by the process of our invention may be established by known analytical methods.

Alkali titrations of alcoholic solutions of the esters, for example, indicate the presence in the ester molecule of one titratable acidic enolic hydrogen. Furthermore, the esters can also be titrated essentially by the standard iodometric method (U. S. P. XI, 1939, supplement page 14) and acetone solutions of the esters readily decolorize, at room temperature, solutions of potassium permanganate in acetone.

While our invention is not limited to any particular hypothesis as to the mechanism of the esterification process, it appears likely that in the presence of sulfuric acid the reaction between isoascorbic acid and an aliphatic monocarboxylic acid occurs according to either or both of the following equations:

(1) 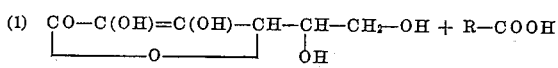

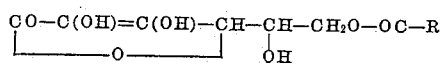

(2) 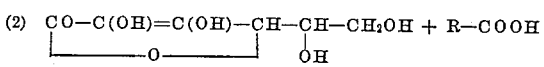

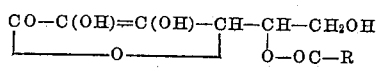

Either course of the esterification reaction would yield isoascorbyl monoesters containing unsubstituted ene-diol groups.

The production of such esters is especially desirable in view of the fact that the oxidation-reduction properties of isoascorbic acid are known to be caused by the presence of an unsubstituted ene-diol group.

It is known, for instance that d-isoascorbic acid is a valuable antioxidant for fatty substances and for aqueous-oil emulsions. (See Journal of Am. Chem. Soc. 1941, 63, 1279; U. S. Patent 2,159,986.) However, d-isoascorbic acid is relatively insoluble in anhydrous fatty and oily substances and this property limits its use as an antioxidant.

It was discovered that the antioxidant properties of compounds containing an unsubstituted ene-diol group are retained and their usefulness enhanced if they are converted to derivatives soluble in fats and oils.

Some of the fat soluble isoascorbyl esters are especially valuable as antioxidants for edible fats.

As illustrative embodiments of a manner in which our invention may be carried out in practice the following examples are given:

*Example 1*

8.8 grams of d-isoascorbic acid and 8.0 grams of lauric acid are dissolved, at room temperature, in 100 cc. of 95 percent sulfuric acid, and the solution is allowed to stand at room temperature for about six hours.

The reaction mixture is then poured slowly and with vigorous agitation into about 500 grams of chopped ice. Agitation is continued until the oily phase of the drowned mixture has solidified. The mixture is then extracted with ether, the ether extract is washed with water until the washings are substantially acid free.

The ether extract is dried and evaporated to dryness.

The dry, light yellow residue thus obtained is powdered and washed by decantation with 200 to 300 cc. of petroleum ether (boiling range 35–60° C.), thereby removing a small amount of unreacted fatty acid present in the reaction product. The unreacted fatty acid is readily recoverable from the washings and may be used over again.

The light yellow residue insoluble in petroleum ether consists essentially of d-isoascorbyl monolaurate.

The yield is about 75–80 percent of the theory.

To remove all traces of moisture from the ester it is dried at about 60° C. under a high vacuum. For analytical purposes the product is purified by recrystallization from an ether-petroleum ether mixture.

The anhydrous d-isoascorbyl monolaurate has the following properties:

| | |
|---|---|
| Melting point _____°C__ | 78–79 |
| Combined fatty acid _____percent__ | 56.2 |
| Equivalent weight by iodine titration_____ | 178.8 |
| Neutralization equivalent_____ | 360.0 |

*Example 2*

A mixture of 27.5 grams of palmityl chloride and 17.6 grams of d-isoascorbic acid is heated for six hours to 75° C. while stirring. Esterification occurs with copious evolution of hydrogen chloride. The reaction mixture is extracted with hot water, cooled and filtered. About 40 grams of a white solid material are obtained consisting of a mixture of isoascorbyl palmitates.

*Example 3*

9.9 grams of myristyl chloride, 7.0 grams of d-isoascorbic acid and 40 cubic centimeters of pyridine are heated to 50° C. for two hours. The reaction mixture is poured into 800 cc. of cold 5 percent aqueous sulfuric acid. The light yellow solid material formed is filtered off and dried. 12 grams of dry substance consisting essentially of mixed isoascorbyl myristates are obtained.

*Example 4*

8.8 grams of d-isoascorbic acid are esterified with 9.1 grams of myristic acid in 100 cc. of 95 percent sulfuric acid by the procedure described in Example 1. The d-isoascorbyl monomyristate thus obtained has the following characteristics.

| | |
|---|---|
| Melting point _____°C__ | 84–85 |
| Combined fatty acids _____per cent__ | 58.6 |
| Equivalent weight by iodine titration____ | 193.2 |
| Neutralization equivalent_____ | 385.0 |

*Example 5* d-Isoascorbyl monopalmitate is prepared by the procedure described in Example 1, using 8.8 grams of d-isoascorbic acid, 10.3 grams of palmitic acid and 100 cc. of 95 percent sulfuric acid.

The ester has the following characteristics:

| | |
|---|---|
| Melting point _____°C__ | 88.5–89.5 |
| Combined fatty acids _____per cent__ | 61.8 |
| Equivalent weight by iodine titration__ | 208.1 |
| Neutralization equivalent_____ | 413.0 |

*Example 6* d-Isoascorbyl monostearate is prepared by the method described in Example 1, using 8.8 grams of d-isoascorbic acid, 11.4 grams of stearic acid and 100 cc. of 95 percent sulfuric acid. The properties of this ester are:

| | |
|---|---:|
| Melting point_____°C__ | 91.5–92.5 |
| Combined fatty acids_____per cent__ | 64.1 |
| Equivalent weight by iodine titration__ | 223.0 |
| Neutralization equivalent_____ | 444.7 |

*Example 7* d-Isoascorbyl monocaproate is prepared by the method described in Example 1, using 8.8 grams of d-isoascorbic acid, 4.6 grams of caproic acid and 100 cc. of 95 percent sulfuric acid.

*Example 8* d-Isoascorbyl mono-9,10-dihydroxystearate is prepared from 8.8 grams of d-isoascorbic acid and 12.6 grams of 9,10-dihydroxystearic acid as described in Example 1, using 100 cc. of 95 percent sulfuric acid.

In the foregoing examples our invention is illustrated as applied to the esterification of d-isoascorbic acid. Similar products are obtained by analogous procedures using l-isoascorbic acid or mixtures of l- and d-isoascorbic acid.

Other aliphatic monocarboxylic acids may be used in the preparation of isoascorbyl esters. Mixtures of isoascorbyl monoesters are obtained by replacing the pure fatty acid by equivalent amounts of commercial mixed fatty acids.

We claim:

1. Isoascorbyl mono-esters of aliphatic saturated monocarboxylic acids, said esters containing an unsubstituted ene-diol group.

2. Isoascorbic compounds represented by the formula

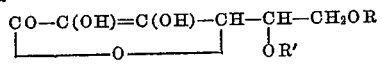

wherein one of the substituents R and R' represents an acyl radical of a saturated aliphatic monocarboxylic acid and the other represents a hydrogen atom.

3. Isoascorbyl monoesters of saturated aliphatic monocarboxylic acids said acids containing from 12 to 18 carbon atoms, said esters containing an unsubstituted ene-diol group.

4. Isoascorbyl mono-esters of lauric acid, said esters containing an unsubstituted ene-diol group.

5. Isoascorbyl mono-esters of palmitic acid, said esters containing an unsubstituted ene-diol group.

6. Isoascorbyl mono-esters of stearic acid, said esters containing an unsubstituted ene-diol group.

7. The method of producing isoascorbyl monoesters containing an unsubstituted ene-diol group which comprises reacting isoascorbic acid with a saturated aliphatic monocarboxylic acid in the presence of concentrated sulfuric acid.

PERCY A. WELLS.
DANIEL SWERN.